(12) United States Patent
Fasciano (10) Patent No.: US 6,336,093 B2
(45) Date of Patent: Jan. 1, 2002

(54) APPARATUS AND METHOD USING SPEECH RECOGNITION AND SCRIPTS TO CAPTURE AUTHOR AND PLAYBACK SYNCHRONIZED AUDIO AND VIDEO

(75) Inventor: Peter Fasciano, Natick, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/007,931

(22) Filed: Jan. 16, 1998

(51) Int. Cl.[7] .......................... G10L 15/08; G10L 21/00
(52) U.S. Cl. ..................................... 704/278
(58) Field of Search .................. 704/270, 275, 704/278; 345/328, 340, 348; 348/594

(56) References Cited

U.S. PATENT DOCUMENTS

| | | | |
|---|---|---|---|
| 4,538,188 A | 8/1985 | Barker et al. ............... | 360/14.3 |
| 4,685,003 A | 8/1987 | Westland ..................... | 360/14.1 |
| 4,746,994 A | 5/1988 | Ettlinger ...................... | 360/13 |
| 5,109,482 A | 4/1992 | Bohrman ..................... | 395/154 |
| 5,136,655 A | 8/1992 | Bronson ..................... | 704/270 |
| 5,148,154 A * | 9/1992 | Mackay et al. ............. | 345/340 |
| 5,388,197 A * | 2/1995 | Rayner ........................ | 345/328 |
| 5,442,744 A | 8/1995 | Piech et al. ................. | 395/154 |
| 5,489,947 A | 2/1996 | Cooper ........................ | 348/589 |
| 5,515,110 A * | 5/1996 | Alig et al. ................... | 348/594 |
| 5,534,942 A | 7/1996 | Bevers, Jr. et al. .......... | 348/569 |
| 5,584,006 A | 12/1996 | Reber et al. ................. | 395/427 |
| 5,634,020 A | 5/1997 | Norton ........................ | 345/727 |
| 5,649,060 A | 7/1997 | Ellozy et al. ................ | 704/278 |
| 5,712,953 A | 1/1998 | Langs ......................... | 704/214 |
| 5,786,814 A * | 7/1998 | Moran et al. ................ | 345/328 |
| 5,801,685 A | 9/1998 | Miller et al. | |
| 5,889,950 A | 3/1999 | Kuzma | |
| 5,999,173 A * | 12/1999 | Ubillos ....................... | 345/328 |

FOREIGN PATENT DOCUMENTS

| | | | |
|---|---|---|---|
| EP | 0 403 118 | 12/1990 | ......... G11B/27/028 |
| EP | 0 469 850 | 2/1992 | ............. G06F/9/44 |
| EP | 0 526064 | 2/1993 | ......... G11B/27/028 |
| EP | 0 564 247 | 10/1993 | ......... G11B/27/031 |
| EP | 0 592 250 | 4/1994 | ......... G11B/27/031 |
| EP | 0 613 145 | 8/1994 | ........... G11B/27/34 |
| EP | 0 689 133 | 12/1995 | ............. G06F/9/44 |
| EP | 0 706 124 | 4/1996 | ............. G06F/9/44 |
| EP | 0 798 917 A2 | 10/1997 | .......... H04N/1/387 |
| EP | 0 877 378 A | 11/1998 | ......... G11B/27/034 |
| EP | 0 899 737 A | 3/1999 | ......... G11B/27/031 |
| EP | 0 902 431 A | 3/1999 | ......... G11B/27/034 |
| WO | WO 93/21636 | 10/1993 | ......... G11B/27/034 |
| WO | WO 94/03897 | 2/1994 | ......... G11B/27/028 |
| WO | WO 97/39411 A | 10/1997 | ........... G06F/17/30 |
| WO | WO 98/05034 | 2/1998 | ......... G11B/27/034 |
| WO | WO 98/25216 A | 6/1998 | ........... G06F/17/30 |

OTHER PUBLICATIONS

Adobe Premiere for Macintosh, All version downloads, www.adobe.com/support/downloads/prmac.htm, pp. 1–2, Nov. 1992–Mar. 2000.*

Kanade, T., "Immersion into Visual Media: New Applications of Image Understanding," IEEE Expert, ISSN 0885–9000, IEEE, vol. 1, No. 1, Feb. 1996, p. 73–80.

(List continued on next page.)

*Primary Examiner*—David D. Knepper
(74) *Attorney, Agent, or Firm*—Peter J. Gordon (57) ABSTRACT

Audio associated with a video program, such as an audio track or live or recorded commentary, may be analyzed to recognize or detect one or more predetermined sound patterns, such as words or sound effects. The recognized or detected sound patterns may be used to enhance video processing, by controlling video capture and/or delivery during editing, or to facilitate selection of clips or splice points during editing.

29 Claims, 6 Drawing Sheets

OTHER PUBLICATIONS

Patent Abstracts of Japan, vol. 097, No. 008, JP 09 091928 A, Abstract and Fig., Apr. 1997, Nippon Telegr 7 Amp; Teleph Corp & NTT>.

Kim, Y–B et al., "Content–Based Video Indexing and Retrieval—A Natural Language Approach," IEICE Transactions on Information and Systems, vol. E79–D, No. 6, Jun. 1996, p. 695–705.

Comparisonics™, Applications of Comparisonics, pp. 1–5, Web site: http://www.comparisonics.com/apps.html printed Mar. 28, 2000.

The Comparisonics™ White Paper/Apr. 1998, Find Audio and Video! See the Audio!, Stephen V. Rice, Ph.D., pp. 1–6, Web site: http://www.comparisonics.com/WhitePaper.html.

* cited by examiner

APPARATUS AND METHOD USING SPEECH RECOGNITION AND SCRIPTS TO CAPTURE AUTHOR AND PLAYBACK SYNCHRONIZED AUDIO AND VIDEO

FIELD OF THE INVENTION

The present invention is related to the use of speech recognition in data capture, processing, editing, display, retrieval and playback. The invention is particularly useful for capture, authoring, and playback of synchronized audio and video data.

BACKGROUND OF THE INVENTION

While speech recognition technology has been developed over several decades, there are few applications in which speech recognition is commonly used, except for voice assisted operation of computers or other equipment, and for transcription of speech into text, for example, in word processors.

Use of speech recognition with synchronized audio and video has been primarily for developing searchable indexes of video databases. Such systems are shown in, for example: "Automatic Content Based Retrieval Of Broadcast News," by M. G. Brown et al. in Proceedings of the ACM International Multimedia Conference and Exhibition 1995, pages 35–43; "Vision: A Digital Video Library," by Wei Li et al., Proceedings of the ACM International Conference on Digital Libraries 1996, pages 19–27; "Speech For Multimedia Information Retrieval," by A. G. Hauptmann et al. in Proceedings of the 8th ACM Symposium on User Interface and Software Technology, pages 79–80, 1995; "Keyword Spotting for Video Soundtrack Indexing," by Philippe Gelin, in Proceedings of ICASSP '96, page 299–302, May 1996; U.S. Pat. No. 5,649,060 (Ellozy et al.); U.S. Pat. No. 5,199,077 (Wilcox et al.); "Correlating Audio and Moving Image Tracks," IBM Technical Disclosure Bulletin No. 10A, Mar. 1991, pages 295–296; U.S. Pat. No. 5,564,227 (Mauldin et al.); "Speech Recognition In The Informedia Digital Video Library: Uses And Limitations," by A. G. Hauptmann in Proceedings of the 7th IEEE Int'l. Conference on Tools with Artificial Intelligence, pages 288–294, 1995; "A Procedure For Automatic Alignment Of Phonetic Transcriptions With Continuous Speech," by H. C. Leung et al., Proceedings of ICASSP '84, pages 2.7.1–2.7.3, 1984; European Patent Application 0507743 (Stenograph Corporation); "Integrated Image And Speech Analysis For Content Based Video Indexing," by Y-L. Chang et al., Proceedings of Multimedia 96, pages 306–313, 1996; and "Four Paradigms for Indexing Video Conferences," by R. Kazman et al., in IEEE Multimedia, Vol. 3, No. 1, Spring 1996, pages 63–73, all of which are hereby incorporated by reference.

Current technology for editing multimedia programs, such as synchronized audio and video sequences, includes systems such as the media composer and film composer systems from Avid Technology, Inc. of Tewksbury, Massachusetts. Some of these systems use time lines to represent a video program. However, management of the available media data may involve a time intensive manual logging process. This process may be difficult where notations from a script, and the script are used, for example, on a system such as shown in U.S. Pat. No. 4,476,994 (Ettlinger). There are many other uses for speech recognition than mere indexing that may assist in the capture, authoring and playback of synchronized audio and video sequences using such tools for production of motion pictures, television programs and broadcast news.

SUMMARY OF THE INVENTION

Audio associated with a video program, such as an audio track or live or recorded commentary, may be analyzed to recognize or detect one or more predetermined sound patterns, such as words or sound effects. The recognized or detected sound patterns may be used to enhance video processing, by controlling video capture and/or delivery during editing, or to facilitate selection of clips or splice points during editing.

For example, sound pattern recognition may be used in combination with a script to automatically match video segments with portions of the script that they represent. The script may be presented on a computer user interface to allow an editor to select a portion of the script. Matching video segments, having the same sound patterns for either speech or sound effects can be presented as options for selection by the editor. These options also may be considered to be equivalent media, although they may not come from the same original source or have the same duration.

Sound pattern recognition also may be used to identify possible splice points in the editing process. For example, an editor may look for a particular spoken word or sound, rather than the mere presence or absence of sound, in a sound track in order to identify an end or beginning of a desired video segment.

The presence of a desired sound or word in an audio track also may be used in the capturing process to identify the beginning or end of a video segment to be captured or may be used to signify an event which triggers recording. The word or sound may be identified in the audio track using sound pattern recognition. The desired word or sound also may be identified in a live audio input from an individual providing commentary either for a video segment being viewed, perhaps during capture, or for a live event being recorded. The word or sound may be selected, for example, from the script, or based on one or more input keywords from an individual user. For example, a news editor may capture satellite feeds automatically when a particular segment includes one or more desired keywords. When natural breaks in the script are used, video may be divided automatically into segments or clips as it is captured.

Speech recognition also may be used to provide for logging of material by an individual. For example, a live audio input from an individual providing commentary either for a video segment being viewed or for a live event being recorded, may be recorded and analyzed for desired words. This commentary may be based on a small vocabulary, such as commonly used for logging of video material, and may be used to index the material in a database.

DETAILED DESCRIPTION

The present invention will be more completely understood through the following detailed description which should be read in conjunction with the attached drawing in which similar reference numbers indicate similar structures. All references cited herein are hereby expressly incorporated by reference.

Figure 1:
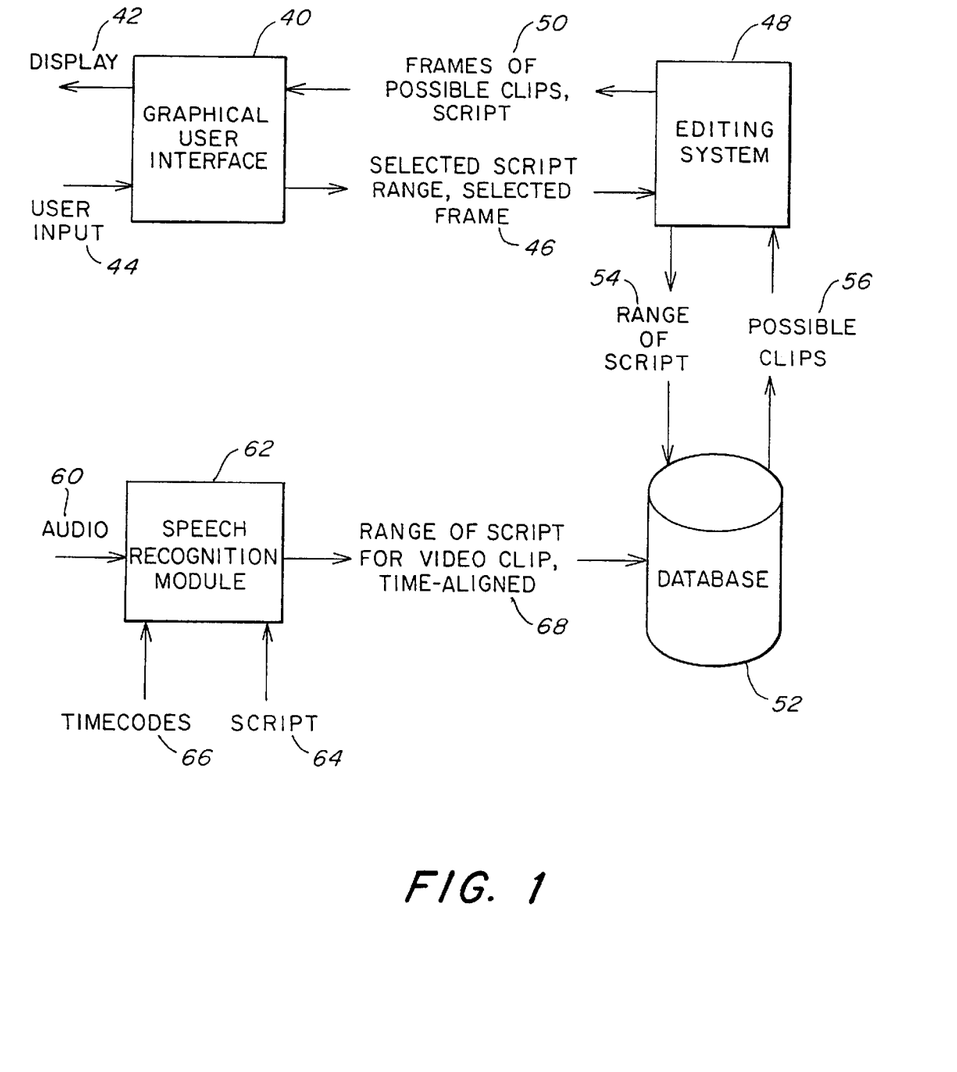
FIG. 1 is a block diagram of a system in one embodiment of the present invention.

FIG. 1 illustrates one embodiment of the invention where speech recognition and the script of a video program are used in combination to enhance the editing process. In this embodiment, sound pattern recognition, particularly speech but also sound effects, may be used in combination with a script to automatically match video segments with portions of the script that they represent. In this embodiment of the invention, the script may be presented to an editor via a computer user interface. One system that displays a script to a user that may be modified in accordance with the invention is shown in U.S. Pat. No 4,746,994 (Ettlinger).

In this embodiment, a graphical user interface 40 displays a portion of a script, as indicated at 42, and frames selected from video clips associated with a selected portion of the script. A portion of the script may be selected in response to user input 44. The user input may also indicate a selected video clip to by used to complete the video program for the selected portion of the script. The selected script range or a selected clip, as indicated at 46, is provided to an editing system 48. In response to receipt of a selected range of the script, the editing system displays the script portion and frames of possible clips for the script as indicated at 50. In order to identify this information, the editing system 48 supplies a range of the script to a database 52. In response, the database returns a set of corresponding clips 56. A corresponding video clip has content including the selected range of the script. This correspondence, rather than overlapping time codes from an equivalent source, may be used to indicate equivalency, and may be used in the manner such as shown in U.S. Pat. No. 5,584,006 (Reber). In response to receipt of a selected frame of a shot, the editing system 48 may update a representation of a video program being edited.

The database 52 may be populated with data about the video clips by capturing video and audio from multiple sources or takes of the video. In this capture process, the captured audio track 60 is supplied to a speech recognition module 62. Speech recognition can be performed using many techniques which are known in the art. For example, the speech recognition module may use a Hidden Markov Model-based form of pattern recognition, such as in the ViaVoice product from IBM, or a phonemic approach. Various other techniques may be used, such as shown in U.S. Pat. No. 5,623,609 (Kaye). Another input to the speech recognition process may be the script 64. The script 64 may be used to improve the speech recognition process by providing a target to which recognized speech may be matched. In some instances, text must be generated only from speech recognition, for example, when the dialogue is spontaneous. Speech recognition module 62 also receives time codes corresponding to the audio, as indicated at 66, which may be used to align the script to the time codes according to the speech recognized in the audio. The output of the speech recognition module 62 is thus the range of the script or text represented by the video clip and a time code aligned version of the script or text. This data as indicated at 68 may be stored in the database 52.

One embodiment of the speech recognition process performed by speech recognition module 62 involves matching the script, sound patterns in the audio, and the time codes using the following procedure. First, the most easily and reliably detected text points, words or syllables are time matched and marked within the clip. These points are those for which the pattern recognition process used has indicated a reasonable level of certainty about the accuracy of a match. The result of this step may be visualized by the following time line:

Recursive analysis may be used with time interpolation, spanning the known valid points for a best approximation to seek a finer match for the words or phrases located in between the known 15 valid points. This step may provide the following result, for example:

An additional recursive step may be performed, to provide the following result, for example:

This recursive matching process ultimately interpolates smaller and smaller passages to map the entire script to the audio track, resolving timing accuracy down to an image, i.e. field or frame, or two. The beginning and ending time of any word or syllable thus is reasonably and reliably mapped across a series of time code addresses. The number of recursions used to make this mapping may be user-defined to allow control of the degree of desired timing accuracy, the computational time and loading of the system. A frame to script mapping for example, may appear as the following:

Frame: |00 01 02 03 04 05 06 07|08 09 10|11 12 13 14 15 16 17|18 19 20 21 22 23 24 25|
       |N        O        W    |I     S|  T  H  E           |T  I     M E           |

The mapping of the script to time codes actually may involve mapping the script to a phonetic or other sound pattern representation of the text which in turn is mapped, for example, using an anray, look up table, list or other data structure to timecodes or other resolution in the time dimension of the audio track.

The speech recognition module may include software that is executed by a computer system that also supports the editing system 48. Alternatively, this computational burden may be removed from the main processor and may be performed using special purpose hardware.

The average rate of speech falls between 100 and 125 words per minute. These words are typically constructed from 150 to 200 syllables. If a timing marker were saved for each syllable or sound pattern of the script, the result would be on average about three matching time references per second between script text and speech, or about one timing match roughly every ten frames. This resolution provides sufficiently fine granularity to support reasonable draft editing driven by a word processor interface using the script. Speech to text matching and subsequent time code frame mapping of each word or syllable as shown above would allow an individual with minimal training to cut and paste the desired dialogue text using a standard word processing interface, and thereby easily assemble a draft cut of a video sequence. The draft edit would allow the individual to quickly define a story in rough form. A frame trimming function could then be invoked at each transition to fine tune the dialogue timing and flow. The script may also be divided into segments and may be associated with a story board to generate a story in rough form, such as shown in U.S. patent application Ser. No. 08/687,926.

Where the same dialogue is recorded from several camera angles and/or over several takes, the editing system 48 may find and present one or more frames from all takes containing a highlighted word or passage in the script. The user then may preview and select a desired camera view or a take. As a further aid to editing directly from text, the system also may generate script marks or display the edited text in different colors or fonts according to a script clerk's camera coverage notations.

The audio track also may be transcribed where no script is available. The text input into the speech recognition process also may include sound effects which may have predetermined sound patterns. Converting spoken dialogue to time annotated and synchronized script text would greatly accelerate the production process.

Figure 2:
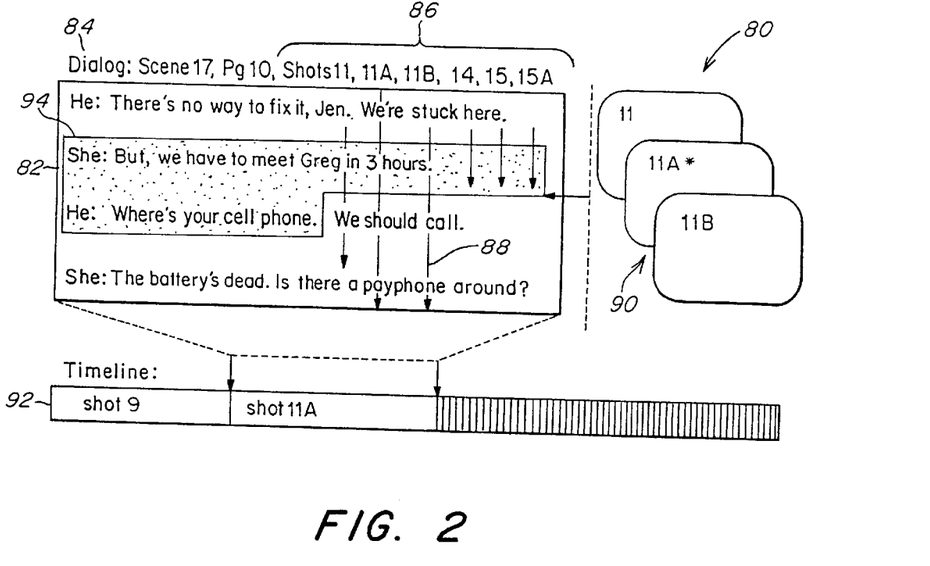
FIG. 2 illustrates one embodiment of a graphical user interface for use in connection with the system of FIG. 1.
Figure 3:
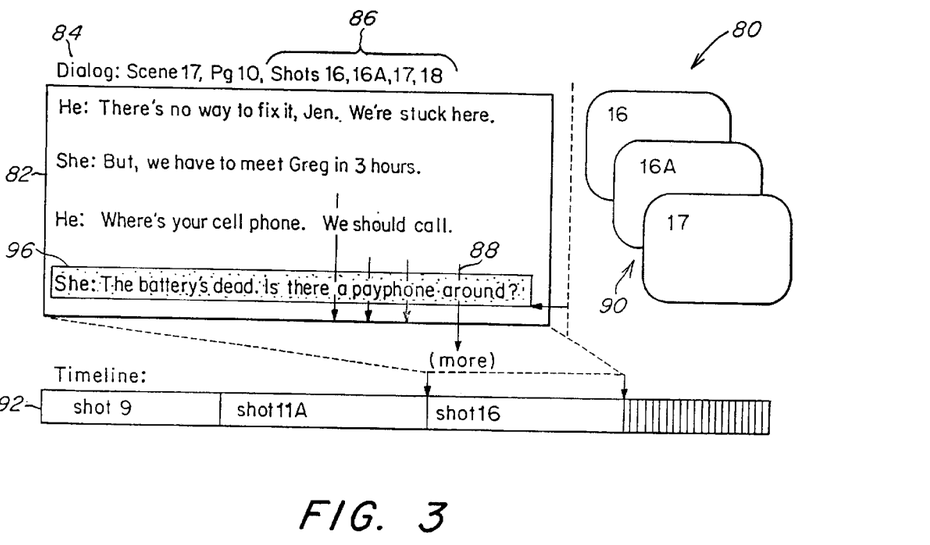
FIG. 3 illustrates another view of the graphical user interface shown in FIG. 2)

Two example graphical user interfaces for use with using scripts to edit a video program will now be described in connection with FIGS. 2–6. Script-based editing is described. for example, in U.S. Pat. No. 4,746,994 and is available from Avid Teclhnology, Inc. In one embodiment of the present invention, as shown in FIG. 2, the user interface is similar to a basic word processor. A display area 80 displays the script (at 82) and an indicator of the portion of the script being viewed (at 84). Highlighting any part of a script causes the editing system to retrieve all the corresponding clips that contain some or all of the highlighted dialog as edit candidates that match some part of the highlighted text 94. The list of corresponding shots may be shown at 86. The range of the script that is covered by the shot appears in the displayed text at 82 with coverage arrows 88, similar to a script clerk's annotated production script. A representative frame for each clip may be displayed at 90. The user may select a candidate shot using an input device. A selected candidate shot may be transferred to the program time line 92. After a shot is selected and placed in a time line for the program, the user may select another segment for which a shot may be selected, as is shown in FIG. 3. The user may highlight new text at 96. After auditioning the candidate clips 90, a selected shot, e.g., shot 16, may be placed in the program time line.

Figure 4:
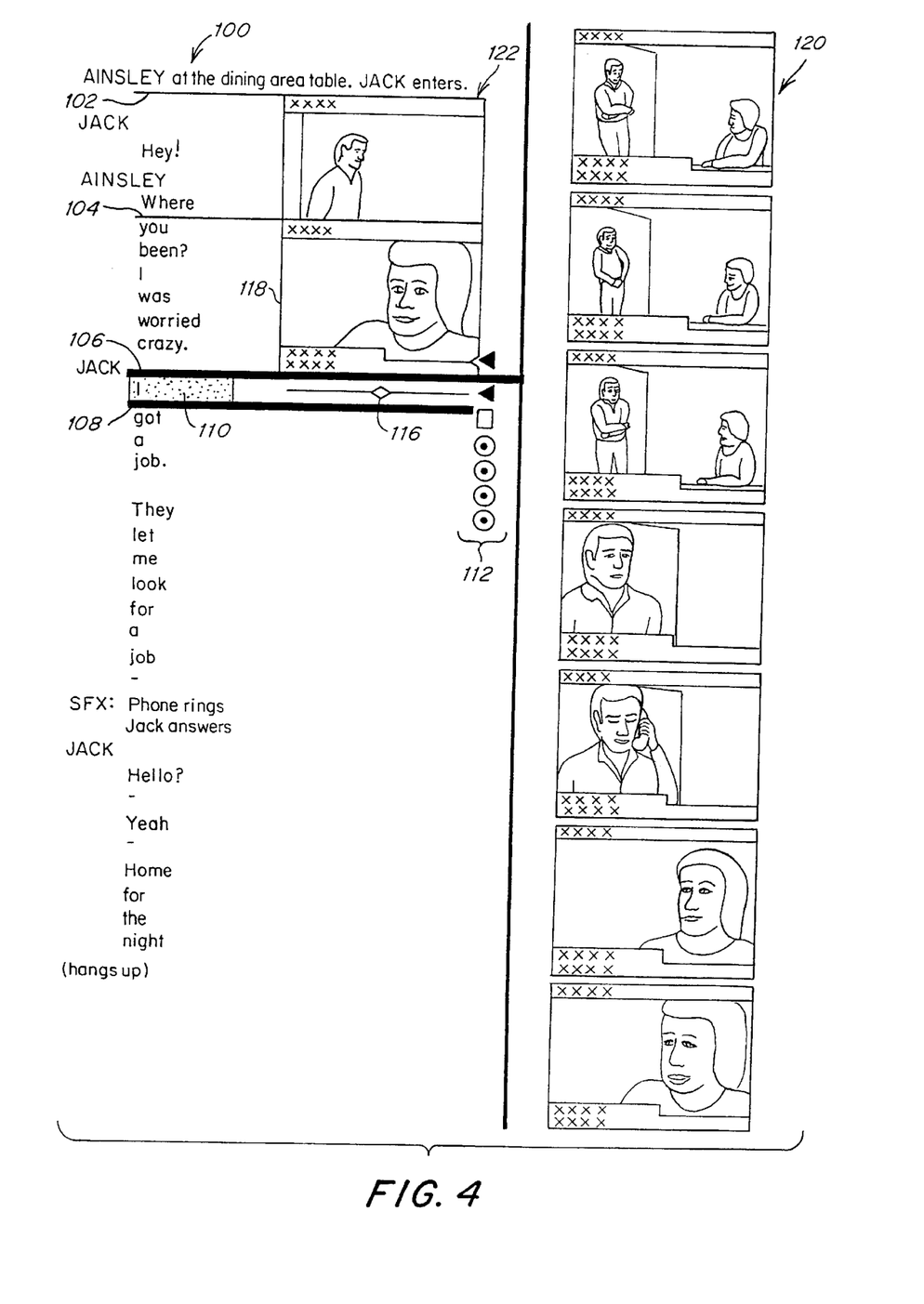
FIG. 4 illustrates a graphical user interface in another embodiment of the system of FIG. 1.

FIG. 4 is an example of another embodiment of a graphical user interlace, which is an automated dialog film editing interface. In this embodiment, there is little direct use of timecodes. The timecodes are shown for illustrative purposes, but may be omitted.

At the left of FIG. 4, the script is formatted in a vertical column 100. Thin horizontal cursor lines 102 and 104 indicate edit points between shots. Thicker cursor lines 106 and 108 bound the top and bottom of box 110 that highlights an active part of the script column 100.

Lines 106 or 108 may be positioned wherever a user desires by moving the line, for example using a mouse, to "capture" a desired portion of the script. The upper cursor line 106 may be positioned just above the first word in the desired portion of script. Upon release of the upper cursor line 106, the candidate shots are displayed in a column 120 to the right and are synchronized to match the first word in the selected script. The lower cursor line 108 may be set to determine a desired coverage of the script dialog for the shot. This coverage is used to identify those candidate shots that include the selected script. As the lower cursor line 108 is moved to cover more or less of the script different candidates can appear or disappear when the cursor is released. When no candidate shot has been selected for this selected dialog, a place holder 116 is indicated in the display.

Figure 5:
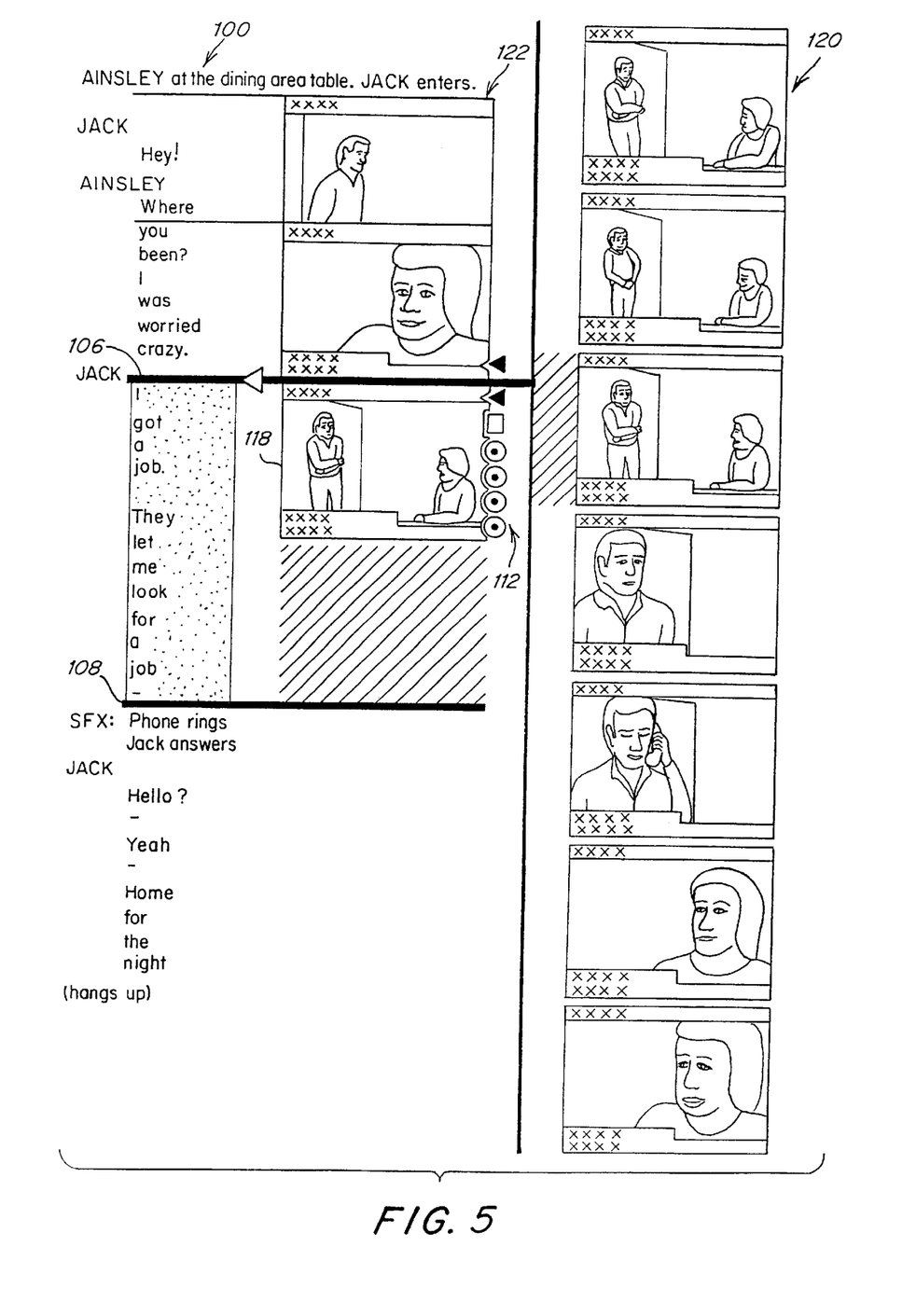
FIG. 5 is another view of the graphical user interface of FIG. 4.

Referring now to FIG. 5, a shot may be selected from those displayed in column 120, for example, by using a mouse. After a shot is selected from column 120, a frame from the shot is displayed in column 112, such as shown at 118. Once a candidate has been finally accepted, then the upper cursor line 106 may advance to the next word in the script following the last word at the end of the edit. The center column 122 of frames is the assembled sequence as it relates to the script at the left. The frame featuring the controls 112 along its right edge is the current edit event. Selecting different candidate frames in column 120 may be used to switch the event image in column 112 much like operating a video switcher.

Figure 6:
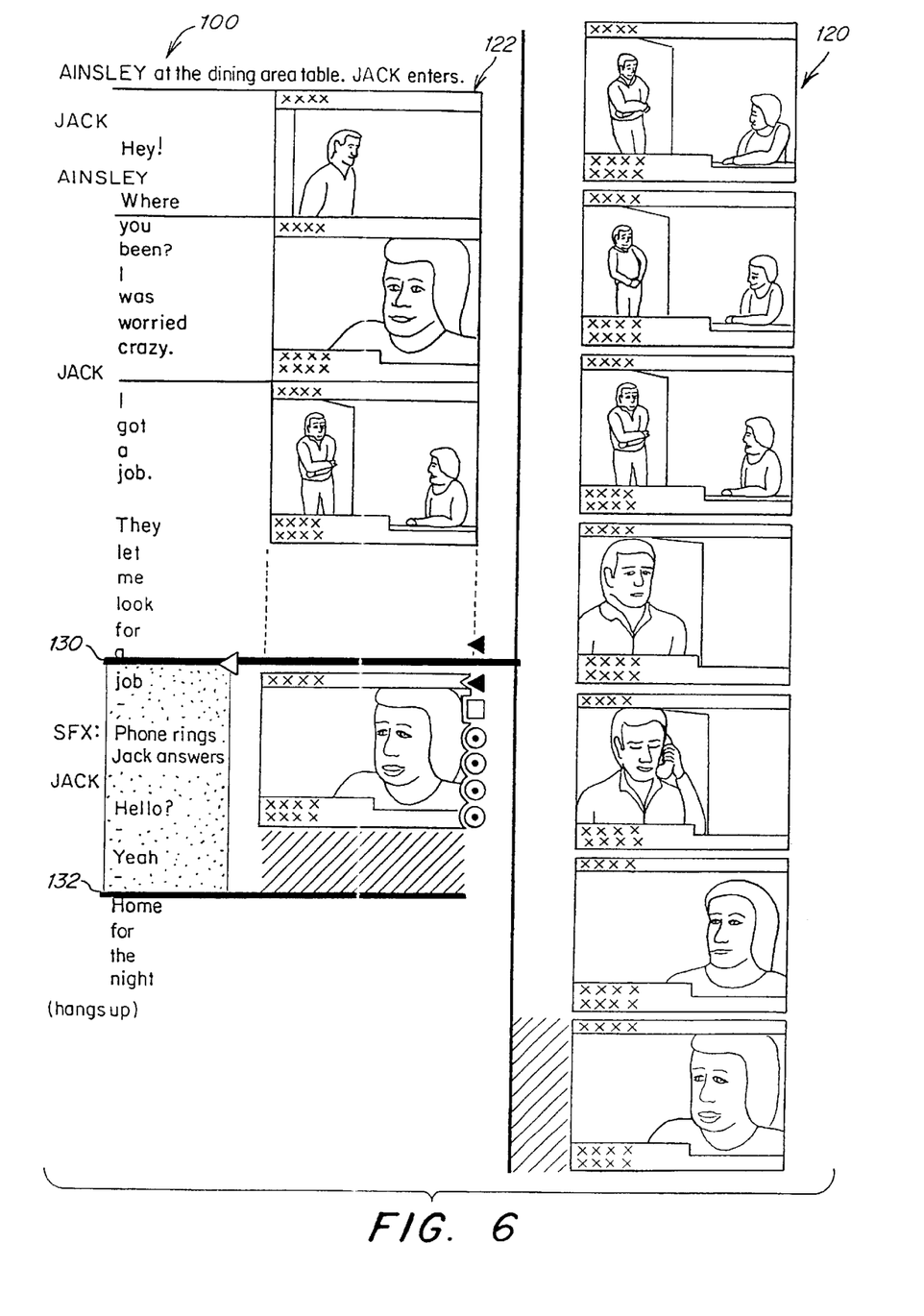
FIG. 6 is another view of the graphical user interface of FIG. 4.

In FIG. 6, the start cursor line 130 a bit prior to a point preceding the last word in the edit shown in FIG. 5. In this case, the dialog may be converted to timecodes in the prior shot in order to perform an approximate matching trim to the end of that shot automatically. By repositioning the cursor over a new span of dialog, as shown between lines 130 and 132, all of the candidates again may be prequalified for coverage of the selected text and the display may be updated to display the starting frames of these candidate shots.

Figure 7:
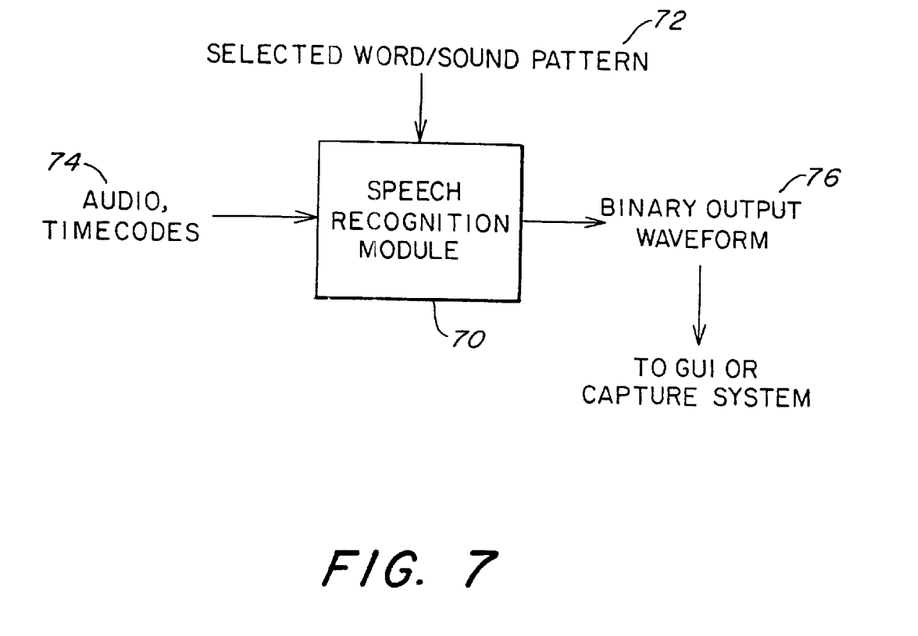
FIG. 7 is a block diagram illustrating a second embodiment of the present invention.

In another embodiment of the invention, the speech recognition module 70, as shown in FIG. 7, receives the audio signal and one or more selected words or sound patterns and possibly timecodes. The selected word or sound pattern, while similar to a script, is used by the speech recognition module to output a binary wave form 76 indicating the presence or absence of the selected word or sound pattern within a given range of the audio stream. An output signal may be used for several purposes. First, the output signal may be displayed so that an editor may identify splice points in the audio track. For example, this signal may be used in an editing interface such as shown in U.S. Pat. No. 5.634,020 (Norton). that indicates the presence or absence of a selected word or sound pattern, rather than the mere presence or absence of sound. In one embodiment, selected words from the script may be used to automatically identify points in the video being captured. Using this process, the natural breaks in the script are used and video may be divided automatically into segments or clips as it is processed.

The detection of a selected word or sound pattern also may be used to control the capturing of video information. For example, the presence of a word may be used to initiate recording while the presence of another word or sound pattern may indicate that the recording is to be stopped. The recognition event may be considered as a discontinuity that starts or stops recording in the manner described in U.S. patent application Ser. No. 07/866,570. In addition, the output of the speech recognition module 70 also may signify an event which triggers recording using a system such as described in PCT Publication WO96/26601, or U.S. patent application Ser. No. 08/835,104.

The audio input into the speech recognition module 70 may be the audio track corresponding to the video signal. Alternatively, the audio input may be a second audio track, such as a live audio input from individual providing commentary for a video segment. For example, an individual may be logging video material that has been recorded. A small subset of words pertinent to the logging process may be used to index the video segments. In this embodiment, the graphical user interface 40 may display selected words from the logging vocabulary to allow an editor to select clips relevant to that category. In addition, the audio input may be commentary on a live event being recorded.

In another embodiment, satellite feeds of news information may be captured. In a news environment, such as shown in PCT Publication WO97/39411, an editor or journalist may be notified of received video information if the capturing module of the system is notified of selected words or sound patterns for each journalist or editor. Upon receipt of matching video segments, the capture module may automatically direct a video clip to be viewed to a journlalist's work station. This capability also may be used without video, by monitoring only audio signals, such as over a telephone line or on radio, and to automatically capture clips using the occurrence of a selected word or sound pattern in an audio signal as an event to control the capturing of the audio, using a system such as described in U.S. patent application Ser. No.08/835,104.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A computer system for editing a video program generated from a plurality of video sources, each video source having one or more video clips, each clip associated with a common audio comprising:

means for analyzing the audio to recognize one or more predetermined sound patterns;

means for retrieving clips from the plurality of video sources using the recognized sound patterns;

means for controlling delivery of the retrieved clips to a display during an editing process;

means for facilitating selection from among the retrieved clips during editing; and means for placing the selected clips in a timeline.

2. The computer system of claim 1, further including means for controlling capture of portions of the video program using the recognized sound patterns.

3. The computer system of claim 2, wherein the means for controlling capture identifies predetermined sound patterns in the audio and further including means for initiating capture of a video clip upon identification of a first sound pattern.

4. The computer system of claim 3, wherein the means for controlling capture further includes means for terminating capture of the video clip upon identification of a second sound pattern.

5. The computer system of claim 1, wherein the audio is an audio track of the video program.

6. The computer system of claim 1, wherein the audio is commentary associated with the video program.

7. The computer system of claim 1, wherein the predetermined sound patterns are words.

8. The computer system of claim 1, wherein the predetermined sound patterns are sound effects.

9. The computer system of claim 1, wherein the means for analyzing uses a script to automatically match clips with portions of the script that they represent.

10. The computer system of claim 9, further comprising:

means for displaying the script on a computer user interface;

means for permitting an editor to select a portion of the script;

means for matching video segments having sound patterns matching the selected portion of the script;

means for displaying the matched video segment as option for selection by the editor.

11. The computer system of claim 1, wherein the means for analyzing identifies predetermined sound patterns in the audio and further including means for indicating possible splice points to a user.

12. The computer system of claim 1, wherein the audio is a live audio input from an individual providing commentary for a video segment, and the means for analyzing identifies desired words in the audio, and further including means for logging the video clip according to desired words identified in the audio.

13. The computer system of claim 1, further comprising means for receiving an audio track from a live audio input.

14. The computer system of claim 13, wherein the audio track is commentary used to log clips of the audio program.

15. The computer system of claim 1, further comprising means for determining a first a first location in a selected clip and a second location in a selected clip, said first and second locations determining the beginning of a selected clip and the end of the selected clip, respectively.

16. A computer system for digitally editing a video program based upon a script associated with the video program using one or more video sources, each of the video sources including one or more video clips and a common audio portion, the system comprising:

means for analyzing the audio portion to recognize one or more predetermined sound patterns;

means for selecting a range of the script;

means for retrieving one or more clips from the one or more video sources that contain sound patterns that match the selected range of the script;

means for displaying the one or more clips that contain sound patterns that match the selected range;

means for enabling the selection of at least one of the clips;

means for placing the selected clips in a timeline.

17. The computer system of claim 16, further comprising means for capturing portions of the video sources using the sound patterns in the selected range.

18. The computer system of claim 16, wherein the audio portions are audio tracks.

19. The computer system of claim 16, wherein the audio portions are commentary.

20. The computer system of claim 16, wherein the sound patterns are words.

21. The computer system of claim 16, wherein the sound patterns are sound effects.

22. The computer system of claim 16, wherein the means for analyzing identifies predetermined words in the audio portions.

23. The computer system of claim 16, further comprising means for indicating possible splice points to a user.

24. The computer system of claim 16, further comprising means for initiating capture of a video segment upon identification of a first sound pattern.

25. The computer system of claim 24, further comprising means for terminating capture of the video segment upon identification of a second sound pattern.

26. The computer system of claim 16, wherein the audio portions are live audio inputs from an individual providing commentary, and the means for analyzing identifies desired words in the audio portions and includes means for logging the video source according to desired words identified in the audio.

27. The computer system of claim 16, further comprising means for receiving an audio track from a live audio input.

28. The computer system of claim 27, wherein the audio track is commentary used to log clips of the audio program.

29. The computer system of claim 16, further comprising means for determining a first a first location in a selected clip and a second location in a selected clip, said first and second locations determining the beginning of a selected clip and the end of the selected clip, respectively.

* * * * *